US011794917B2

United States Patent
Guerchkovitch et al.

(10) Patent No.: US 11,794,917 B2
(45) Date of Patent: Oct. 24, 2023

(54) PARALLEL CONTROL LOOPS FOR HYBRID ELECTRIC AIRCRAFT

(71) Applicant: Pratt & Whitney Canada Corp., Longueuil (CA)

(72) Inventors: Leonid Guerchkovitch, Dollard des Ormeaux (CA); Manuj Dhingra, Glastonbury, CT (US); Boris Karpman, Marlborough, CT (US); Aaron J. Kaufman, Manchester, CT (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 544 days.

(21) Appl. No.: 16/874,912

(22) Filed: May 15, 2020

(65) Prior Publication Data

US 2021/0354843 A1    Nov. 18, 2021

(51) Int. Cl.
*B64D 31/06* (2006.01)
*B64D 27/24* (2006.01)
(Continued)

(52) U.S. Cl.
CPC ............ *B64D 31/06* (2013.01); *B64D 27/24* (2013.01); *B64D 31/00* (2013.01); *B64D 2027/026* (2013.01)

(58) Field of Classification Search
CPC ................. F02C 9/285; F05D 2270/05; F05D 2270/051; F05D 2270/052; B64D 2027/026
See application file for complete search history.

(56) References Cited

U.S. PATENT DOCUMENTS 6,496,397 B2   12/2002   Sakai et al.
7,023,216 B2    4/2006   Prema et al.
(Continued)

FOREIGN PATENT DOCUMENTS

EP    1129891 A2    9/2001
EP    2482438 A2    8/2012
(Continued)

OTHER PUBLICATIONS

Gartenberg, Lenny, Battery Centric Serial Hybrid Aircraft Performance and Design, Embry-Riddle Aeronautical University, "Battery Centric Serial Hybrid Aircraft Performance and Design Space" (2017), Dissertations and Theses. 327 (https://commons.erau.edu/edt/327)(hereinafter "Gartenberg") (Year: 2017).*

(Continued)

Primary Examiner — Jean Paul Cass
(74) Attorney, Agent, or Firm — Norton Rose Fulbright Canada LLP

(57) ABSTRACT

A method of controlling a hybrid-electric aircraft powerplant includes running a first control loop for command of a thermal engine based on error between total response commanded for a hybrid-electric powerplant and total response from the hybrid-electric powerplant. A second control loop runs in parallel with the first control loop for commanding the thermal engine based on error between maximum thermal engine output and total response commanded. A third control loop runs in parallel with the first and second control loops for commanding engine/propeller speed, wherein the third control loop outputs a speed control enable or disable status. A fourth control loop runs in parallel with the first, second, and third control loops for commanding the electric motor with non-zero demand when the second control loop is above control to add response from the electric motor to (Continued)

response from the thermal engine to achieve the response commanded.

5 Claims, 1 Drawing Sheet

(51) Int. Cl.
*B64D 31/00* (2006.01)
*B64D 27/02* (2006.01)

(56) References Cited

U.S. PATENT DOCUMENTS

| | | |
|---|---|---|
| 7,358,698 B2 | 4/2008 | Seguchi et al. |
| 7,425,806 B2 | 9/2008 | Schnetzka et al. |
| 7,513,119 B2 | 4/2009 | Zielinski et al. |
| 7,772,791 B2 | 8/2010 | Lim et al. |
| 8,047,420 B2 | 11/2011 | Stroh |
| 8,155,801 B2 | 4/2012 | Chang et al. |
| 8,169,179 B2 | 5/2012 | Mohan et al. |
| 8,196,299 B2 | 6/2012 | Lee et al. |
| 8,279,620 B2 | 10/2012 | Herron et al. |
| 8,376,069 B2 | 2/2013 | Nakatsu et al. |
| 8,423,214 B2 | 4/2013 | Kshatriya |
| 8,587,977 B2 | 11/2013 | Nishikimi et al. |
| 8,610,382 B2 | 12/2013 | Goldammer et al. |
| 8,648,559 B2 | 2/2014 | Singh |
| 8,727,271 B2 | 5/2014 | Salyer |
| 8,831,816 B2 | 9/2014 | Kwon et al. |
| 8,831,864 B1 | 9/2014 | Chen et al. |
| 8,868,278 B2 | 10/2014 | Amano |
| 8,931,732 B2 | 1/2015 | Sirohi et al. |
| 8,958,936 B2 | 2/2015 | Treharne et al. |
| 8,964,424 B2 | 2/2015 | Sakakibara |
| 9,045,223 B2 | 6/2015 | Connaulte et al. |
| 9,077,257 B2 | 7/2015 | Frium |
| 9,174,741 B2 | 11/2015 | Suntharalingam et al. |
| 9,181,866 B2 | 11/2015 | Jensen et al. |
| 9,341,145 B2 | 5/2016 | Maier |
| 9,370,992 B2 | 6/2016 | Holmes et al. |
| 9,496,802 B2 | 11/2016 | Matsumoto |
| 9,561,860 B2 | 2/2017 | Knapp et al. |
| 9,564,257 B2 | 2/2017 | Karlen et al. |
| 9,647,556 B2 | 5/2017 | Li et al. |
| 9,714,025 B2 | 7/2017 | Yang et al. |
| 9,787,217 B2 | 10/2017 | Hu et al. |
| 9,789,768 B1 | 10/2017 | Meier |
| 9,853,573 B2 | 12/2017 | Siri |
| 9,923,485 B2 | 3/2018 | Fu et al. |
| 9,937,803 B2 | 4/2018 | Siegel et al. |
| 9,954,335 B2 | 4/2018 | Hasegawa et al. |
| 10,000,202 B2 | 6/2018 | Park et al. |
| 10,006,375 B1 | 6/2018 | Wagner et al. |
| 10,040,566 B2 | 8/2018 | Waltner |
| 10,122,165 B2 | 11/2018 | Zare |
| 10,124,886 B2 | 11/2018 | Perkins et al. |
| 10,131,442 B2 | 11/2018 | Waltner et al. |
| 10,137,981 B2 | 11/2018 | Miller et al. |
| 10,141,829 B2 | 11/2018 | Fullmer et al. |
| 10,145,291 B1 | 12/2018 | Thomassin et al. |
| 10,183,664 B2 | 1/2019 | Yang et al. |
| 10,207,698 B2 | 2/2019 | Kim et al. |
| 10,273,019 B2 | 4/2019 | Sands et al. |
| 10,351,253 B2 | 7/2019 | Dong et al. |
| 10,374,329 B2 | 8/2019 | Ruess et al. |
| 10,382,225 B2 | 8/2019 | Dormiani et al. |
| 10,425,032 B2 | 9/2019 | Tapadia et al. |
| 10,432,129 B2 | 10/2019 | Mori et al. |
| 2005/0209752 A1* | 9/2005 | Ono .............. B62D 5/008 701/41 |
| 2011/0168835 A1 | 7/2011 | Oliver |
| 2011/0198439 A1 | 8/2011 | Rotger et al. |
| 2012/0119020 A1 | 5/2012 | Burns et al. |
| 2012/0153076 A1 | 6/2012 | Burns et al. |
| 2013/0087654 A1 | 4/2013 | Seibt |
| 2013/0018108 A1 | 7/2013 | Montero et al. |
| 2013/0261853 A1* | 10/2013 | Shue .............. G05D 1/0088 701/3 |
| 2013/0341934 A1 | 12/2013 | Kawanishi |
| 2014/0138479 A1 | 5/2014 | Vieillard et al. |
| 2014/0158816 A1 | 6/2014 | DeLorean |
| 2014/0345281 A1 | 11/2014 | Galbraith |
| 2015/0042155 A1 | 2/2015 | Vieillard et al. |
| 2015/0353189 A1 | 12/2015 | Kharitonov |
| 2016/0122007 A1 | 5/2016 | Cox et al. |
| 2016/0375994 A1 | 12/2016 | Rossotto |
| 2017/0066539 A1 | 3/2017 | van der Westhuizen et al. |
| 2018/0002025 A1 | 1/2018 | Lents et al. |
| 2018/0134413 A1 | 5/2018 | Halsey et al. |
| 2018/0208305 A1 | 7/2018 | Lloyd et al. |
| 2018/0346139 A1 | 12/2018 | Ferran et al. |
| 2018/0354615 A1 | 12/2018 | Groninga et al. |
| 2018/0363564 A1* | 12/2018 | Geneste .............. H02K 7/1823 |
| 2019/0031333 A1 | 1/2019 | Groninga et al. |
| 2019/0241274 A1* | 8/2019 | Hunkel .............. B60L 50/50 |
| 2020/0140106 A1 | 5/2020 | Dougherty |
| 2020/0277063 A1* | 9/2020 | Thomassin .......... B64D 31/06 |
| 2020/0277064 A1* | 9/2020 | Thomassin .......... B64D 43/00 |
| 2020/0277071 A1* | 9/2020 | LaTulipe .............. B64D 27/10 |
| 2020/0277073 A1* | 9/2020 | Thomassin .......... B64D 31/12 |
| 2020/0277075 A1* | 9/2020 | Dubreuil ............ F01M 11/0004 |
| 2020/0298988 A1* | 9/2020 | LaTulipe .............. F02B 39/10 |
| 2021/0009282 A1* | 1/2021 | Long .................. B64D 27/24 |
| 2021/0101691 A1* | 4/2021 | Mark .................. B64D 27/24 |
| 2021/0354841 A1* | 11/2021 | Poisson .............. B64D 27/04 |
| 2021/0354842 A1* | 11/2021 | Guerchkovitch ......... B64F 5/60 |
| 2021/0354843 A1* | 11/2021 | Guerchkovitch ...... B64D 31/06 |

FOREIGN PATENT DOCUMENTS

| | | | |
|---|---|---|---|
| EP | 2889221 A1 | 7/2015 | |
| EP | 3163990 A1 | 5/2017 | |
| EP | 3090951 B1 | 12/2018 | |
| EP | 3434592 A1 | 1/2019 | |
| EP | 3547528 A1 | 10/2019 | |
| EP | 3936712 A1 * | 1/2022 | ........ B64C 11/303 |
| EP | 3992085 A1 * | 5/2022 | ........ B64D 27/02 |
| JP | 2011006041 A | 1/2011 | |
| JP | 2017121925 A | 7/2017 | |
| KR | 20130073244 A | 7/2013 | |
| KR | 101615486 B1 | 4/2016 | |
| KR | 101682670 B1 | 12/2016 | |
| WO | 2008/125077 | 10/2008 | |
| WO | 2011037852 | 3/2011 | |
| WO | 2014/137365 | 9/2014 | |
| WO | 201682325 | 6/2016 | |
| WO | 201733320 | 3/2017 | |
| WO | 2017114643 A1 | 7/2017 | |
| WO | 2018191769 A1 | 10/2018 | |
| WO | 2018/227270 | 12/2018 | |
| WO | WO-2020180380 A1 * | 9/2020 | ........ B64D 35/08 |

OTHER PUBLICATIONS

Guan, Qiao, et al., A review of electromechanical actuators for More/All Electric aircraft systems, Proc IMechE Part C: J Mechanical Engineering Science 2018, vol. 232(22) 4128-4151 (https://journals.sagepub.com/doi/pdf/10.1177/0954406217749869) (hereinafter "Guan") (Year: 2018).*

Extended European Search for Report for European Patent Application No. EP21174211.9, dated Oct. 14, 2021.

* cited by examiner

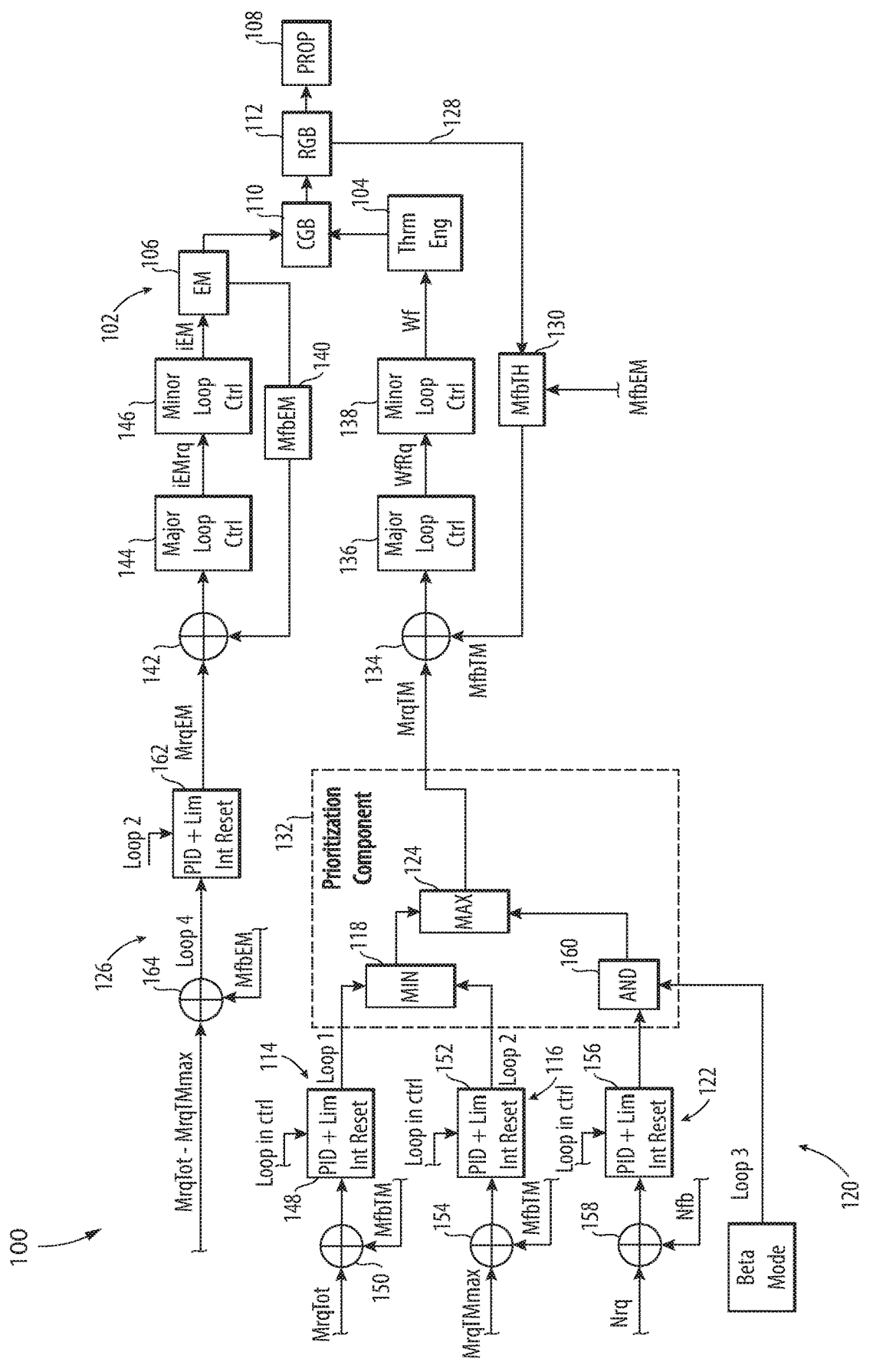

PARALLEL CONTROL LOOPS FOR HYBRID ELECTRIC AIRCRAFT

BACKGROUND

1. Field

The present disclosure relates to control schemes for aircraft, and more particularly to control loops for hybrid electric aircraft.

2. Description of Related Art

To control the power request for a hybrid electric aircraft, the control system is required to calculate the power request for both the thermal engine and the electric motor system components. In addition, e.g. for a turboprop aircraft, a propeller/engine speed is commanded for the low speed/power portion of flight.

It is required to transition into and out of the various control loops without any adverse transient or steady state effects while meeting the constraints of the electrical and thermal engine such as maximum output, response rate, protection functions, and the like.

The conventional techniques have been considered satisfactory for their intended purpose. However, there is an ever present need for improved systems and methods for control loops for hybrid electric aircraft. This disclosure provides a solution for this need.

SUMMARY

A method of controlling a hybrid-electric aircraft powerplant includes, for a hybrid-electric aircraft powerplant having a thermal engine and an electric motor, running a first control loop for command of the thermal engine based on error between total response commanded for the hybrid-electric powerplant and total response from the hybrid-electric powerplant. The method includes running a second control loop in parallel with the first control loop for commanding the thermal engine based on error between maximum thermal engine output and total response commanded. The method includes using a low selector between the first control loop and the second control loop to command the thermal engine with the lower of responses commanded from the first and second control loops. The method includes running a third control loop in parallel with the first and second control loops for commanding engine/propeller speed, wherein the third control loop outputs a speed control enable or disable status, and using a high selector between output of the third control loop and the low selector. The method includes running a fourth control loop in parallel with the first, second, and third control loops for commanding the electric motor with non-zero demand when the second control loop is above control to add response from the electric motor to response from the thermal engine to achieve the response commanded.

The response in total response commanded and total response in the first control loop can be torque. The response in the total response commanded in the second control loop can be torque. The response in the fourth control loop can be torque.

Commanding the thermal engine can include controlling fuel flow to the thermal engine. Commanding the electric motor can include controlling electrical power supplied to the electric motor. The electric motor and thermal engine can be connected together in parallel to a combining gear box (CGB) to drive a propeller. The combining gear box can connect to the propeller through a reduction gear box (RGB). Sensory feedback from the RGB can be combined with sensory feedback from the electric motor to determine torque feedback from the thermal engine.

A system includes a hybrid-electric powerplant for an aircraft including a thermal engine and an electric motor each operatively connected to provide torque to drive an air mover for thrust. A first control loop is connected for command of the thermal engine based on error between total response commanded for the hybrid-electric powerplant and total response from the hybrid-electric powerplant. A second control loop is connected in parallel with the first control loop for commanding the thermal engine based on error between maximum thermal engine output and total response commanded. A low selector is connected between the first control loop and the second control loop to command the thermal engine with the lower of responses commanded from the first and second control loops. A third control loop is connected in parallel with the first and second control loops for commanding engine/propeller speed, wherein the third control loop outputs a speed control enable or disable status. A high selector is connected between output of the third control loop and the low selector. A fourth control loop is connected in parallel with the first, second, and third control loops for commanding the electric motor with non-zero demand when the second control loop is above control to add response from the electric motor to response from the thermal engine to achieve the response commanded.

The air mover can be a propeller. The electric motor and thermal engine can be connected together in parallel to a combining gear box (CGB) to drive the propeller. The combining gear box can connect to the propeller through a reduction gear box (RGB).

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view or simulation diagram of an embodiment of a system constructed in accordance with the present disclosure, showing the four parallel control loops.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used for controlling hybrid-electric powerplants such as for driving air movers for aircraft thrust.

The system 100 includes a hybrid-electric powerplant 102 for an aircraft including a thermal engine 104 and an electric motor 106 each operatively connected to provide torque to drive an air mover, e.g. propeller 108, for thrust. The air mover is a propeller 108, however those skilled in the art will readily appreciate that any other suitable type of air mover such as a fan, ducted fan, or the like can be used without departing from the scope of this disclosure. The electric motor 106 and thermal engine 104 are connected together in parallel to a combining gear box (CGB) 110. The CGB 110 connects to the propeller 108 through a reduction gear box (RGB) 112.

A first control loop 114 is connected for command of the thermal engine 104 based on error between total torque (MrqTot) commanded, e.g. commanded from a pilot or autonomous system, for the hybrid-electric powerplant 102 and total response from the hybrid-electric powerplant (MfbTM, torque feedback from the thermal engine 104). Commanding the thermal engine 104 includes controlling fuel flow to the thermal engine.

A second control loop 116 is connected in parallel with the first control loop 114 for commanding the thermal engine 104 based on error between maximum thermal engine output (MrqTMMax) and total torque commanded (MrqTot). A low select 118 is connected between the first control loop 114 and the second control loop 116 to command the thermal engine 104 with the lower of the responses commanded from the first and second control loops 114, 116. While torque is used herein as an example of response used for feedback control, those skilled in the art will readily appreciate that any suitable response can be used, such as speed, power, or the like, without departing from the scope of this disclosure.

A third control loop 120 is connected in parallel with the first and second control loops 114, 116 for commanding speed of the thermal engine 104 (and/or the propeller 108). The third control loop 120 outputs a speed control enable or disable status of the speed controller 122. A high selector 124 is connected between combined output of the third control loop/speed controller 120, 122 (anded by anding component 160) and the low selector 118 to output MrqTM (torque demanded from the thermal engine 104). Sensor feedback 128 from the RGB is combined with sensor feedback from the electric motor (MfbEM in FIG. 1) at box 130 to determine torque feedback from the thermal engine, Mfb_TM. The prioritization component selects the correct commanded or requested torque MrqTM from among the first, second, and third control loops 114, 116, 120. The requested or commanded torque MrqTM is summed/differenced with the torque feedback from the thermal engine MfbTM at component 134, which outputs the error between the two (MrqTM and MfbTM). This sum/difference is passed to the major control loop 136, which outputs WfRq (fuel flow required to the thermal engine 104) to the minor control loop 138, which outputs Wf (actual fuel flow going to the thermal engine 104) to the thermal engine 104.

A fourth control loop 126 is connected in parallel with the first, second, and third control loops 114, 116, 120 for commanding the electric motor 106 with non-zero demand when the second control loop 116 is above control to add response (e.g. torque) from the electric motor 106 to response (e.g. torque) from the thermal engine 104 to achieve the response commanded. Commanding the electric motor 106 includes controlling electrical power supplied to the electric motor 106. The fourth control loop 126 outputs MrqEM, requested torque for the electric motor 106. This is summed/differenced with feedback 140 from the electric motor 106 at component 142, which outputs the error between the two (MrqEM, MfbRM). This sum/difference is passed through the major loop control 144, which outputs iEMrq (current commanded by the electronic powertrain controller or EPC) to the minor loop control 146, which outputs iEM (actual current going to the EPC) to the electric motor 118.

The first control loop 114 includes a proportional-integral-derivative (PID) integrator 148 that receives as input the output of a summation/differencing component 150. The component 150 receives total torque demanded or commanded MrqTot and torque feedback of the thermal engine 104 MfbTM, and outputs the sum/difference to the integrator 148. The integrator 148 outputs to the low selector 118.

The second control loop 116 includes a PID integrator 152 that receives the output of a summation/differencing component 154. The component 154 receives maximum torque output of the thermal engine 104 (MrqTMmax) and torque feedback of the thermal engine 104 (MfgTM), and outputs the sum/difference to the integrator 152. The integrator 152 outputs to the low selector 118 for selection of the lower of the two outputs of the first and second control loops 114, 116 as described above.

The speed controller 122 of the third control loop 120 incudes a PID integrator 156 that receives the output of a summation/differencing component 158. The component 158 receives propeller speed commanded or required (Nrq) and actual propeller speed feedback (Nfb), and outputs the sum/difference to the integrator 156. The integrator 156 outputs to the anding component 160 to the integral output is anded with the beta mode input of the third control loop 120 a described above. The beta mode in this context, and the box labeled "Beta Mode" in FIG. 1, refer to speed control mode for the engine control system.

The fourth control loop 126 includes a PID integrator 162 that receives the output of a summation/differencing component 164. The component 164 receives the difference between total torque demanded or commanded and maximum torque output of the thermal engine 104 (MrqTot minus MrqTMmax) and sums/differences this with torque feedback of the electric motor 106 (MfbEM) to outputs the sum/difference to the integrator 162. The integrator 162 outputs to the 142 as described above.

The methods herein include constantly resetting a respective integrator 148, 152, 156, 162 to the value of the loop in control, defined as the loop whose torque request is selected as MrqTM based on the prioritization component 132, while the respective control loop is running in the background and is not actively commanding, thus preventing integrator windup error and assuring seamless transition between loops actively controlling the thermal engine 104. The respective integrators 148, 152, 156, 162 are reset with a respective reset command ("Loop in ctrl" in FIG. 1) once a respective control loop 114, 116, 120 begins actively commanding.

For each control loop 114, 116, 120, 126, the PID control integrator path (including the respective integrator 148, 152, 156, 162) is reset to the value of the loop in control. For example if the first control loop 114 is in control (meaning MrqTM=signal from the integrator 148 of the first control loop 114 (Loop 1 in FIG. 1), the integrators 152, 156 of the PID controllers for the second and third control loops 116, 122 (Loops 2 and 3 in FIG. 1) are reset to the value of the signal coming from the PID controller (intergrator 148) of the first control loop 114 (Loop 1 in FIG. 1). This is indicated in FIG. 1 for each of the integrators 148, 152, 156 by the respective arrow designated "Loop in ctl."

Potential benefits of this disclosure include the following. It is possible to control the power demand of a hybrid-electric powerplant without any abrupt transitions between control loops. The parallel control loops can ensure continuous control of the propulsion system. This architecture can provide an opportunity to adjust the overall system power response of the hybrid-electric powerplant by adjusting the gains and constants of the individual control loops. This can also allow for switching commands from energy/torque demand to a particular engine or propeller speed command.

The methods and systems of the present disclosure, as described above and shown in the drawings, provide for controlling hybrid-electric powerplants such as for driving air movers for aircraft thrust. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling a hybrid-electric aircraft powerplant comprising:
   a hybrid-electric aircraft powerplant having a thermal engine and an electric motor, running a first control loop for command of the thermal engine based on error between total response commanded for the hybrid-electric aircraft powerplant and total response from the hybrid-electric aircraft powerplant (MrqTot) and torque feedback from the thermal engine (MfbTM);
   running a second control loop in parallel with the first control loop for commanding the thermal engine based on error between maximum thermal engine output (MrqTMmax) and total response commanded;
   using a low selector between the first control loop and the second control loop to command the thermal engine with the lower of responses commanded from the first and second control loops;
   running a third control loop in parallel with the first and second control loops for commanding engine/propeller speed, wherein the third control loop outputs a speed control enable or disable status;
   using a high selector between output of the third control loop and the low selector; and
   running a fourth control loop in parallel with the first, second, and third control loops for commanding the electric motor with non-zero demand when the second control loop is above control to add response from the electric motor to response from the thermal engine to achieve the response commanded,
   wherein:
      commanding the thermal engine includes controlling fuel flow to the thermal engine;
      the electric motor and thermal engine are connected together in parallel to a combining gear box (CGB) to drive a propeller;
      the combining gear box connects to the propeller through a reduction gear box (RGB); and
      sensory feedback from the RGB is combined with sensory feedback from the electric motor (MfbEM) to determine torque feedback from the thermal engine (MfbTM).

2. The method as recited in claim 1, wherein the response in total response commanded (MrqTot) and total response in the first control loop is torque.

3. The method as recited in claim 1, wherein the response in the total response commanded in the second control loop is torque.

4. The method as recited in claim 1, wherein the response in the fourth control loop is torque.

5. The method as recited in claim 1, wherein commanding the electric motor includes controlling electrical power supplied to the electric motor.

* * * * *